United States Patent [19]

Armier et al.

[11] Patent Number: 4,839,496

[45] Date of Patent: Jun. 13, 1989

[54] LASER WELDING DEVICE FOR WELDING HOLLOW SECTIONS AND FLAT SECTIONS

[75] Inventors: Karl-Heinz Armier, Hamburg; Bernhard Müller, Rellingen, both of Fed. Rep. of Germany

[73] Assignee: Rofin-Sinar Laser GmbH, Hamburg, Fed. Rep. of Germany

[21] Appl. No.: 251,151

[22] Filed: Sep. 29, 1988

[30] Foreign Application Priority Data

Oct. 7, 1987 [DE] Fed. Rep. of Germany ... 8713417[U]

[51] Int. Cl.⁴ ............................................. B23K 26/00
[52] U.S. Cl. ......................... 219/121.63; 219/121.74; 219/121.78
[58] Field of Search ...................... 219/121.63, 121.64, 219/121.74, 121.78, 121.6, 121.85

[56] References Cited

U.S. PATENT DOCUMENTS

| 4,354,090 | 10/1982 | Nilsen | 219/121.63 |
| 4,436,979 | 3/1984 | Nilsen | 219/121.63 |
| 4,713,519 | 12/1987 | Bersch et al. | 219/121.63 |

Primary Examiner—C. L. Albritton
Attorney, Agent, or Firm—Townsend and Townsend

[57] ABSTRACT

The laser welding device for welding hollow sections (1) and flat sections which are to be welded flush to one another, having a detection device (7) for one or both edges to be welded and having a tracking device (7, 8) for the welding head which is adjustable transversely to the direction of the weld seam, is characterized in that it exhibits deflecting mirrors (10, 11) for the laser light which are disposed obliquely in relation to the laser beam axis (9) and which are pivotable about this axis (9), in that the detection device is designed as a mechanical scanner (7), and in that the scanner (7) and the deflecting mirrors (10, 11) are connected to one another for common pivoting movement (FIG. 1).

10 Claims, 5 Drawing Sheets

LASER WELDING DEVICE FOR WELDING HOLLOW SECTIONS AND FLAT SECTIONS

DESCRIPTION

The invention relates to a laser welding device for welding hollow sections and flat sections which are to be welded flush to one another, having a detection device for one or both edges to be welded and having a tracking device for the welding head which is adjustable transversely to the direction of the weld seam.

In welding, it is generally important that the welding head is guided precisely along the edges at which the welding is to take place. This is especially important in the case of automatic laser welding devices, since, on account of the very small laser light spot, a very precise setting of this light spot in relation to the edges to be welded is also necessary. Thus, it is necessary to track the focused laser beam in the seam position with a tolerance of 0.05 mm or even less.

In the case of known systems, this is achieved by an optical scanning and an electronic readjustment. An apparatus of such a kind is very sensitive to dirt, since for obvious reasons in optical scanning is no longer possible or is only possible in an imprecise manner if the optical device becomes dirty. Furthermore, this known apparatus is very costly and can be used only for moderate welding speeds, since, on the one hand, the readjustment must be very rapid, and on the other hand, an overshooting in the readjustment must be avoided.

The object of the invention consists in providing a laser welding device with which the readjustment takes place with low expenditure in a very precise manner and independently of the respective welding speed.

The manner of achieving this object, according to the invention, consists in that the laser welding device exhibits deflecting mirrors for the laser light which are disposed obliquely in relation to the laser beam axis and which are pivotable about this axis, in that the detection device is designed as a mechanical scanner, and in that the scanner and the deflecting mirrors are connected to one another for common pivoting movement.

The laser beam is deflected by the deflecting mirrors, in the vicinity of the desired welding position, out of the original laser beam axis. This deflection can be altered by rotation of the pivotable deflecting mirrors. The tracking of the laser beam can then take place merely by rotation of these deflecting mirrors, without it being necessary to track the entire, very heavy laser or however to track the workpiece transversely to the direction of the weld seam, both of which would be very Furthermore, the detection device is designed as a mechanical scanner. Accordingly, the disadvantages such as high cost and susceptibility to disturbance on the part of the optical systems are avoided. Finally, the scanner is connected substantially rigidly to the deflecting mirrors or to an appropriate housing, for common pivoting movement. Thus, if the scanner moves on account of irregularities of the edges towards one side, then the deflecting mirrors and the optical parts connected thereto as well as the laser beam will directly and immediately follow this deviation. Thus, it is ensured, in a very simple manner that the welding takes place in all instances precisely at the correct position.

Expediently, two deflecting mirrors will be used, by which the laser beam is actually displaced laterally, but still in all instances is nevertheless parallel to the original laser beam.

If the scanner is held in a guide permitting a movement perpendicular to the workpiece it can follow unevennesses of the workpiece. In this case, the scanner is expediently spring-urged in the direction towards the workpiece.

It has proved to be particularly expedient to secure the scanner in a guide which permits, on the one hand, a movement in the direction perpendicular to the workpiece, but on the other hand also a movement perpendicular thereto in the transverse direction in relation to the weld seam. In this case, a cross roller stage or the like has proved to be particularly advantageous.

If a guide disposed transversely to the seam, having a stop for the scanner or parts connected thereto, is provided, the welding head or laser beam can be adjusted laterally relative to the scanner. In this case, an adjusting screw is particularly expedient as the stop.

Advantageously, the scanner is designed as a scanning roller. However it is also possible to design the scanner as a needle or sliding blade.

Expediently, four pressure rollers are used, in order to press the edges to be welded against one another. This compression takes place in the first instance by means of two pressure rollers, behind which the gap between the two edges to be welded opens again slightly. The scanner can engage at this position of the slit which is opening again, and the welding can be carried out. In the working direction therebehind, two further pressure rollers are then provided. These two last mentioned pressure rollers can also be replaced by sliding jaws or ball bush bearings.

The invention is described hereinbelow with the aid of advantageous embodiments, with reference to the accompanying drawings. In the drawings.

Figure 1:
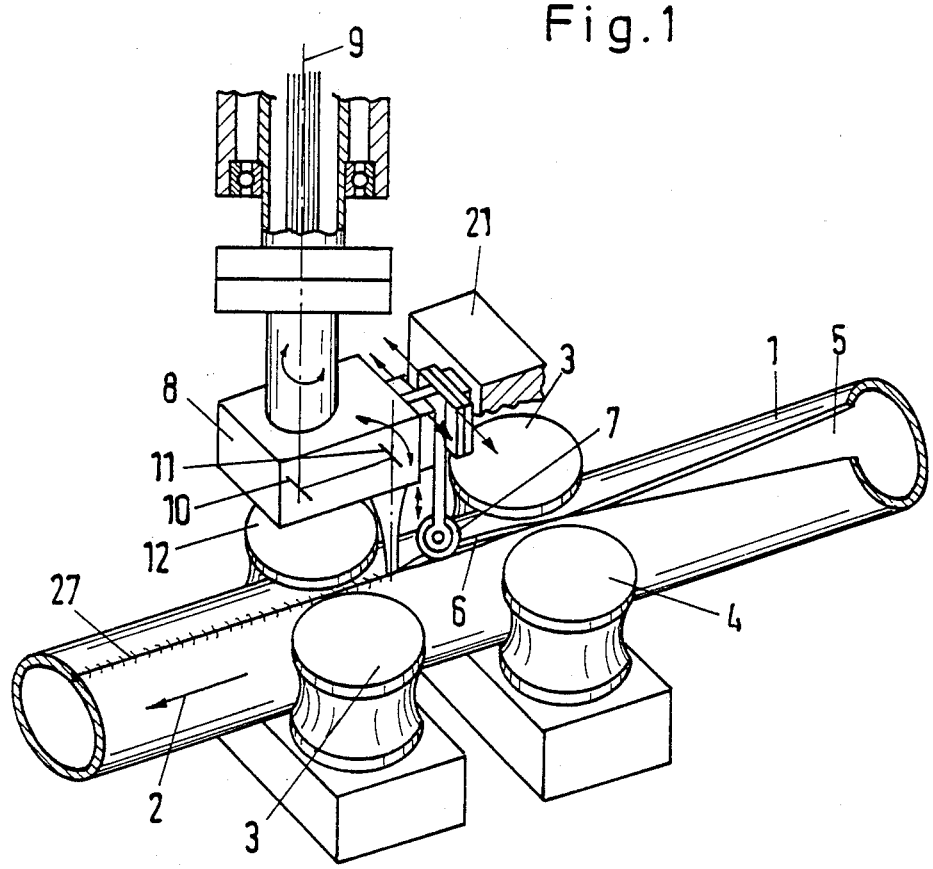
FIG. 1 shows, in a perspective view, the general construction of the laser welding device according to the invention.

FIG. 1 shows how a tube 1 to be provided with a longitudinal weld seam is guided through a laser welding device in the direction of the arrow 2. For this purpose it is in the first instance compressed by two rollers 3, 4, which can also be provided with drives (not shown), to such an extent that the opposite edges of the tube which is being bent together contact one another. Behind this pair of rollers 3, 4, the gap 5 of the tube seam will open again slightly to form a gap 6, on account of the elastic properties of the tube material. In this region of the gap 6, the precise position of this gap 6 or of the edges of the tube material is now scanned by a scanning roller 7. If the gap 6 has been laterally displaced, then the scanning roller 7 is also laterally displaced and thereby a housing 8, which is pivotable about the laser light axis 9, will deviate laterally. As a result of this, the laser light beam, which is directed downwards with its axis displaced by two deflecting mirrors 10, 11, is likewise laterally displaced, so that the focused laser beam impinges precisely at the desired position. Subsequently this welded region then passes between two further rollers 12, 13; in this case, the spacing between welding point and these rollers 12, 13 is, in general, chosen so as to be so large that here the material which is melted by the welding process is no longer plastic. The finished weld seam is furthermore shown at 27.

Figure 2:
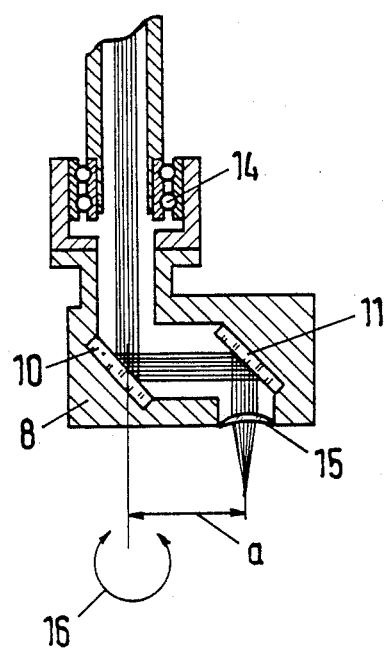
FIG. 2 to 4 show various modes of the deflection of the laser beam by means of deflecting mirrors.
Figure 3:
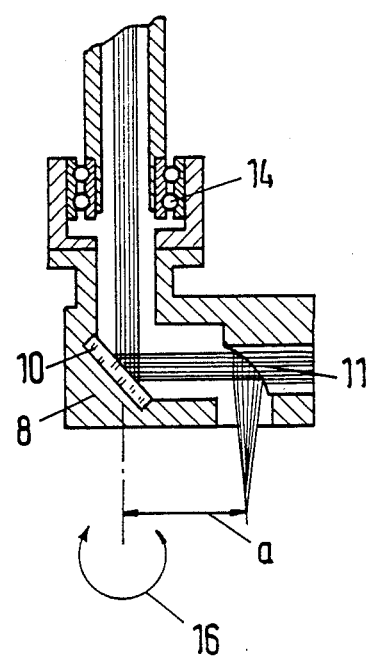
Figure 4:
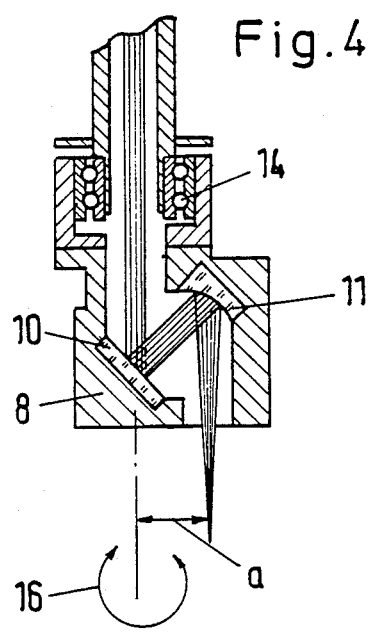

FIGS. 2 to 4 show three types of deflection of the laser beam. In each case, it is possible to see a lower housing part 8, which is pivotable about the axis of the laser light, for example by means of bearings 14.

In the embodiment of FIG. 2, the laser beam impinges in the first instance on a plane mirror 10 disposed at 45° and subsequently on a further plane mirror 11, which is likewise disposed at 45°. The laser light which is thus deflected twice is then focused by a focusing lens 15. If the housing part 8 is rotated in the direction of the double arrow 16, then the focused laser beam describes a circular arc with the radius a.

In the embodiment of FIG. 3, a plane mirror 10 disposed at 45° is likewise provided. The further mirror 11 is, however, a 90° parabolic mirror (off-axis mirror), one of the curvatures of which is circular. With this arrangement, it is possible to dispense with a separate focusing lens 15.

In the embodiment of FIG. 4, the plane mirror 10 is not oriented at 45°, but is more inclined towards the laser axis. The second mirror 11 is a full paraboloid mirror. In all three embodiments, however, a laser beam is opbtained, which can be deviated by deviation of the housing 8 on a circular arc portion with the radius a.

Figure 5:
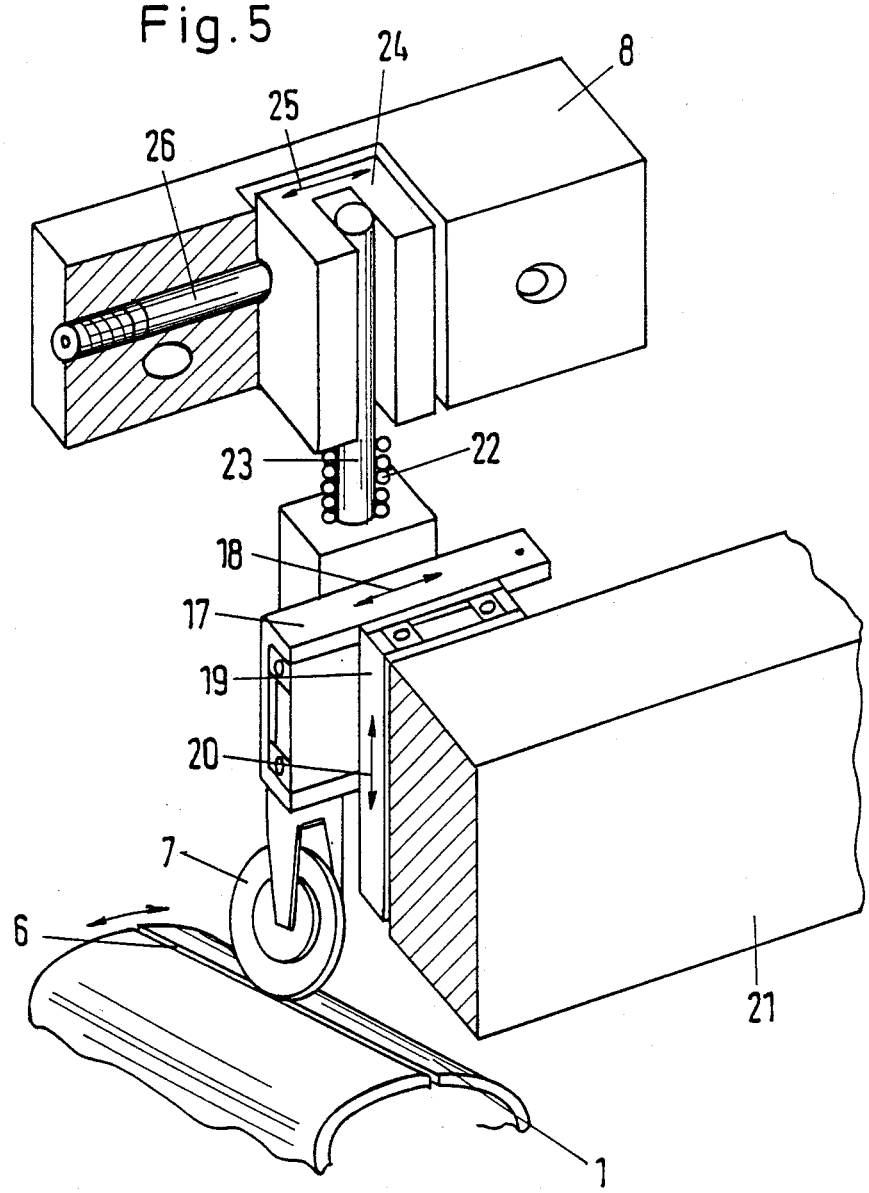
FIG. 5 shows the guiding devices for the scanner in greater detail and in perspective view.

The details of the guiding of the scanning roller 7 are represented in principle in FIG. 5. The scanning roller 7 is secured to a first slide element 17, which can move in a horizontal direction in the direction of the double arrow 18 and, for this purpose, is slidingly secured in a slide element 19. This slide element 19, in turn, can move in the direction of the double arrow 20 in a vertical direction, and for this purpose, is slidingly secured to a carrier 21 or the like, which extends over the tube 1. In this case, the parts 17 and 19 form a cross roller stage or the like. By means of this cross roller guiding, cross slide guiding or the like, the roller 7 is pressed by a helical spring 22 downwards against the workpiece 1. This spring 22 is disposed on a pin 23 and is supported on the housing 8 of the welding head or a part connected thereto. This part connected thereto is an element 24, which can execute a movement in the horizontal direction in the direction of the double arrow 25; in this case, the precise location in the horizontal direction is specified by an adjusting screw 26. As a result of this, the original adjustment is possible, in order to set the welding head in the transverse direction correctly to the location of the scanning roller 7.

Figure 6:
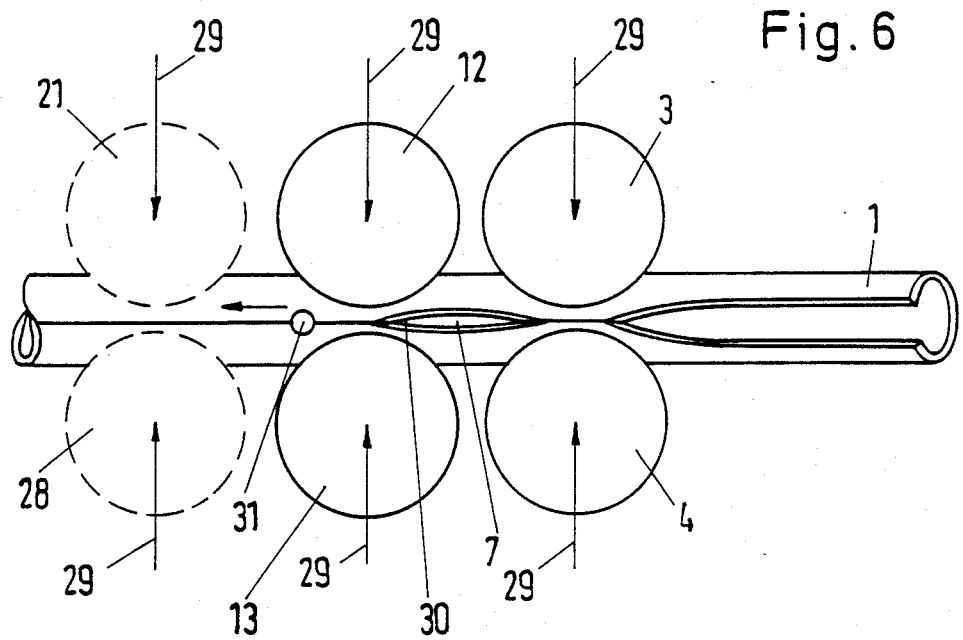
FIG. 6 shows a diagrammatic plan view to illustrate the geometrical relationships.

Geometric details can also be seen from FIG. 6. This figures shows not only the pressure roller 3, 4, 12 and 13, but also, in broken lines, two further guide rollers 27 and 28 for the tube 1. All these pressure rollers or guide rollers are pressed towards one another in the direction of the arrows 29 in the direction towards the tube 1. The location of the scanning roller is designated by 7, and the location at which the focused laser beam impinges on the workpiece by 30. 31 designates the axis of rotation for the housing 8; in this case, this axis of rotation 31 coincides with the original axis of the laser light. As is clearly seen, a certain deflection of the scanning roller 7 leads to a somewhat smaller deflection of the focused laser beam 30. The mathematical ratio in which these deflections are related to one another can easily be determined with the aid of the radiation law. In this case the corresponding mathematical ratios between scanner deflection and laser beam deflection can also be altered by altering the location of the scanning roller 7.

Figure 7:
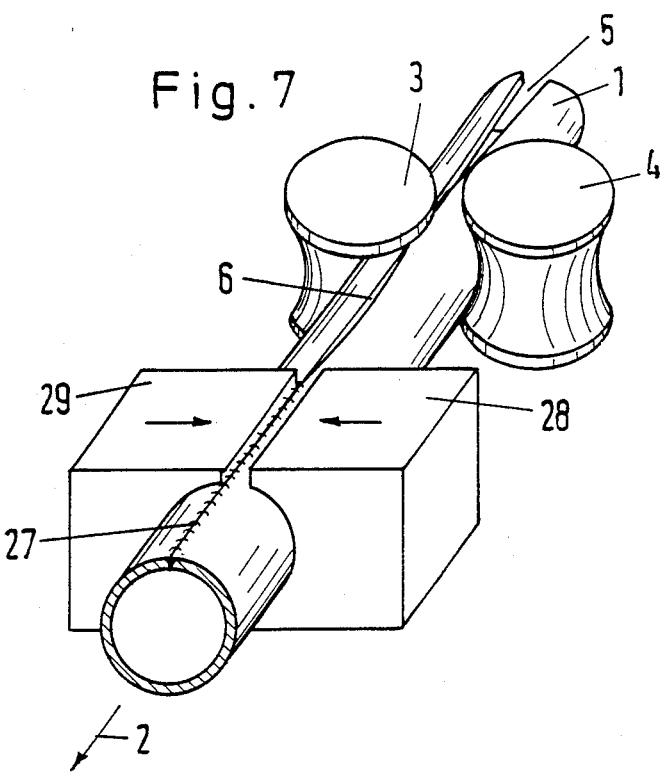
FIGS. 7 and 8 show modified forms of the devices by which the objects to be welded are held.
Figure 8:
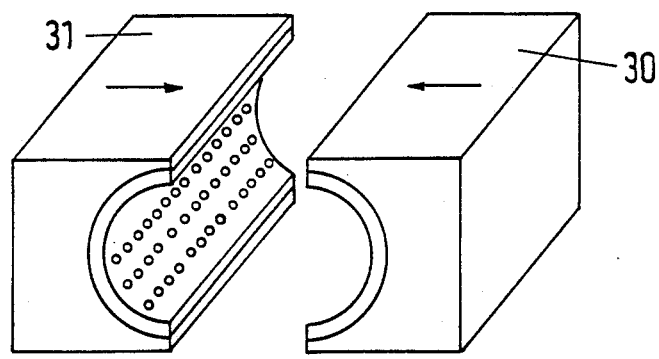

In the embodiment shown in FIG. 7, the second pair of pressure rollers 12, 13 is replaced by sliding jaws 28, 29, in which the tube 1 can slide in the direction of the arrow 2. In place of the sliding jaws 28, 29 it is also possible for ball bush bearings 30, 31 to be used, which are shown in FIG. 8.

We claim:

1. Laser welding device for welding hollow sections and flat sections which are to be welded flush to one another, having a detection device for one or both edges to be welded and having a tracking device for the welding head which is adjustable transversely to the direction of the weld seam, characterized in that it exhibits deflecting mirrors (10, 11) for the laser light which are disposed obliquely in relation to the laser beam axis (9) and which are pivotable about this axis (9), in that the detection device is designed as a mechanical scanner (7), and in that the scanner (7) and the deflection mirrors (10, 11) are connected to one another for common pivoting movement.

2. Laser welding device according to claim 1, characterized in that the scanner (7) is held in a guide (19) permitting a movement perpendicular to the workpiece (1).

3. Laser welding device according to claim 2, characterized in that the scanner (7) is spring-urged in the direction towards the workpiece (1).

4. Laser welding device according to claim 1 characterized in that the scanner (7) is secured to a cross roller stage or cross carriages (17, 19).

5. Laser welding device according to claim 1 characterized in that a guide, disposed transversely to the seam (27), having a stop for the scanner (7) or parts connected thereto is provided.

6. Laser welding device according to claim 5, characterized in that the stop exhibits an adjusting screw (26).

7. Laser welding device according to claim 1 characterized in that the scanner is designed as a scanning roller (7).

8. Laser welding device according to claim 1 characterized in that the scanner (7) engages in an adjustable slit (6) defined by pressure rollers (3, 4, 12 13).

9. Laser welding device according to claim 1 characterized in that the scanner (7) engages in an adjustable slit defined by two pressure rollers (3, 4) and two sliding jaws (28, 29).

10. Laser welding device according to claim 1 characterized in that the scanner (7) engages in an adjustable slit (6) defined by pressure rollers (3, 4) and ball bush bearings (30, 31).

* * * * *